United States Patent [19]

Hintzman

[11] 3,973,744
[45] Aug. 10, 1976

[54] LATCHING MECHANISM

[75] Inventor: Roland D. Hintzman, San Mateo, Calif.

[73] Assignee: Sargent Industries, Inc., Los Angeles, Calif.

[22] Filed: June 12, 1975

[21] Appl. No.: 586,263

[52] U.S. Cl. .................. 244/137 P; 24/230 AV; 182/48; 193/25 B; 220/315; 244/DIG. 2; 403/329

[51] Int. Cl.² .................................... B64D 25/14

[58] Field of Search ............ 244/137 P, DIG. 2; 193/25 B; 182/48; 24/230 AT, 230 AV, 211 M; 220/315, 323; 403/327, 329, 330

[56] References Cited
UNITED STATES PATENTS

| | | | |
|---|---|---|---|
| 3,384,406 | 5/1968 | Welch et al. | 24/211 M X |
| 3,554,344 | 1/1971 | Summer et al. | 244/DIG. 2 |

Primary Examiner—Trygve M. Blix
Assistant Examiner—Barry L. Kelmachter
Attorney, Agent, or Firm—Ellsworth R. Roston

[57] ABSTRACT

A system for the emergency debarkation of personnel from an aircraft includes a first container member mounted to the door of the aircraft and a second container member hingeably mounted on the first container member to form a container for an inflatable raft or slide. A first latch assembly attached to the first container member and a second latch assembly attached to the second container member cooperate to secure the container when the container is closed. The second latch assembly includes first and second latch arms pivotal on the second container member between a first position in engaging relationship with the first latch assembly and a second position in disengaging relationship with the first latch assembly. Locking members cooperate with the latch arms for positively locking the second latch assembly in the first position to inhibit opening of the container. The locking members are manually actuable (for installation and removal of slide or slide/raft) when the door of the aircraft is closed but are automatically actuable with the opening of the door of the aircraft to permit the opening of the container and the deployment of the inflatable slide or slide/raft.

28 Claims, 10 Drawing Figures

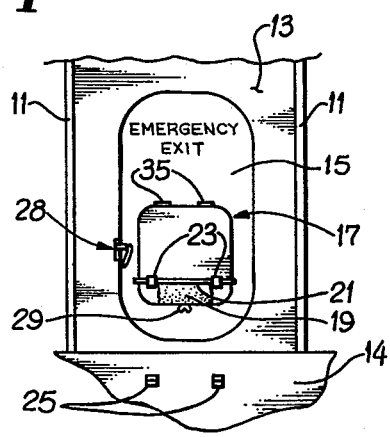
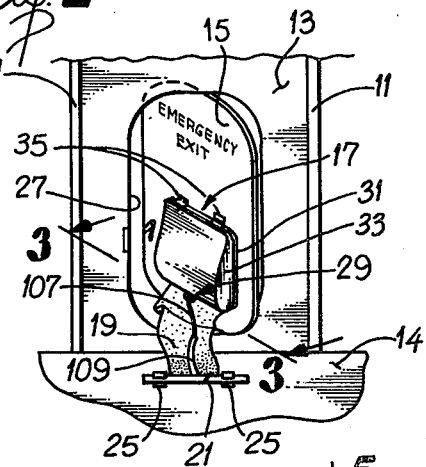
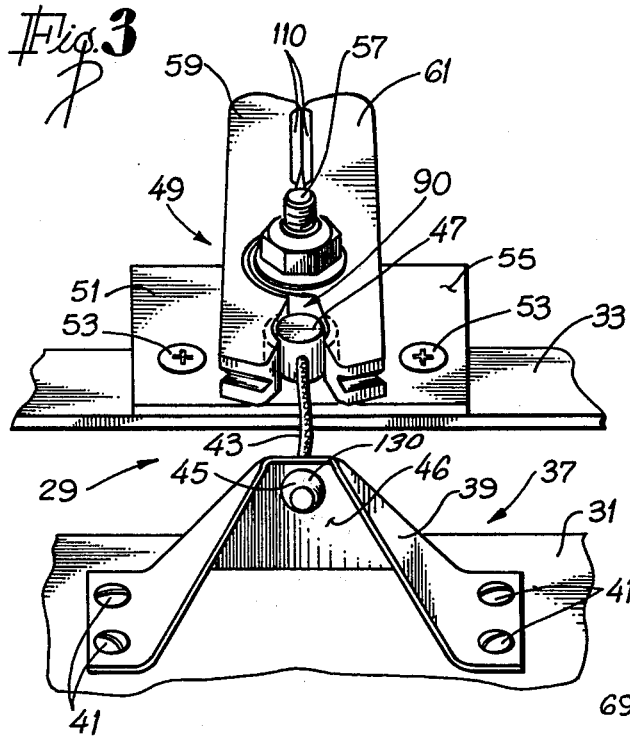
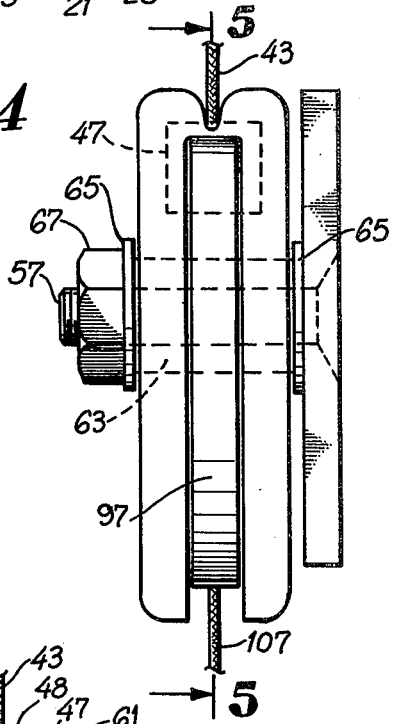
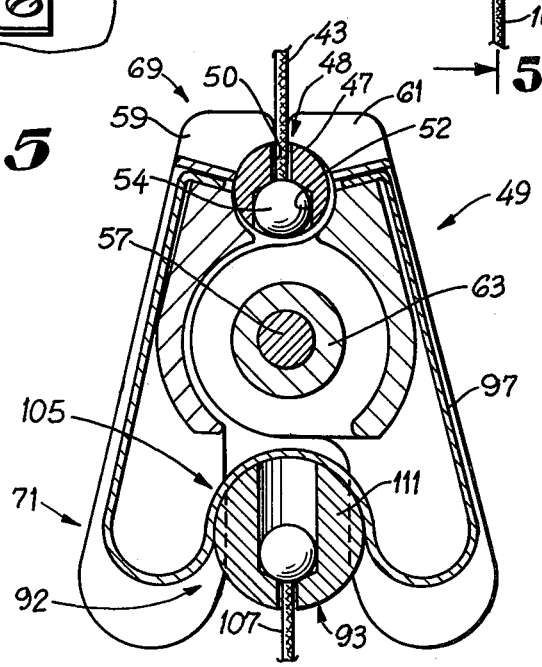

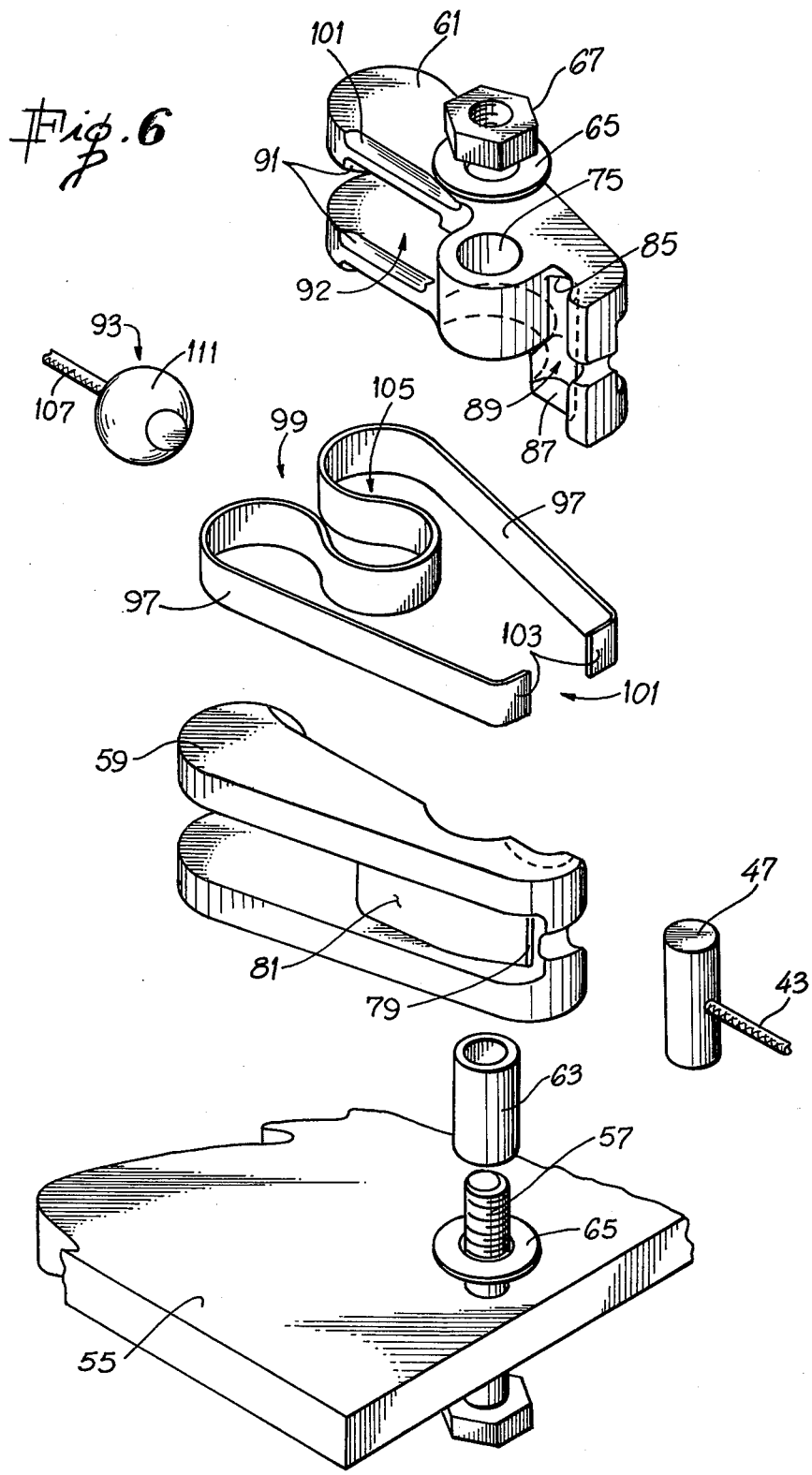

LATCHING MECHANISM

BACKGROUND OF THE INVENTION

1. Field of the Invention

This invention relates generally to latch apparatus and more specifically to a latch adapted for use in an emergency debarkation system of an aircraft.

2. Description of the Prior Art

Commercial aircraft are required by the regulations of the Federal Aviation Administration to have an emergency debarkation system. Such a system is designed to provide for the emergency evacuation of all personnel in the aircraft when the stairways and tunnels commonly used at airports are not available. Such an emergency debarkation system might be employed when an aircraft is forced to land at other than an airport, either on the land or in the water.

These emergency debarkation systems commonly includes slides, which are designed to extend from an elevated hatch of the aircraft down to surface level. For emergency debarkation in water, the system will commonly includes slides or slide/rafts. These slides or slide/rafts are typically of the type which include bottles of pressurized gas for automatically inflating the slides or rafts.

The slides or slide/rafts are normally packaged in a deflated state in a container having two major portions which are hinged with respect to each other and mounted on doors or hatches at emergency exits of the aircraft.

It is desirable that these containers be provided with latches which can withstand significant forces acting in certain axes of the aircraft which tend to open the containers. At the same time, it is desirable that the latches be openable in response to relatively small forces acting in other certain axes of the aircraft in order to permit the slide or slide/raft to fall free of the container. It is further desirable that the latches be simple to set. Preferably, a single person should be able to load the slide or slide/raft in the associated container and set the latch with the container mounted on the emergency door.

The latch should be highly reliable as is the case with all aircraft equipment. Under normal circumstances, it must remain latched even though exposed to excessive vibrations, accelerations and contaminations. However, under emergent conditions, it is desirable that the latch be automatically operable to unlock the container and the deploy the associated slide or slide/raft.

If one latch apparatus of the prior art, first and second latch members are fixed to the respective major portions of the container. Each of the latch members includes a pair of parallel spring arms which extend toward the arms of the opposite latch member. Each of the spring arms in each of the latch members is provided with a hole.

The latch assembly is provided with an over-center toggle which has a pair of pins which extend in opposite directions. To set the latch, the toggle pins can be disposed in the holes of the spring arms associated with the first latch members. Then the toggle can be pushed over center. This procedure typically requires a significant amount of force and often causes injury to the user resulting from the pinching of his fingers. When the toggle is in place, the pins of the toggle protrude through the holes of the first latch member.

Once the toggle is mounted in the first latch member, the container can be shut. As the major members of the container are brought together, the holes associated with the arms in the second latch member are pressed over the protruding pins of the toggle. This too requires a significant amount of force. To operate the latch and open the container, a lanyard is provided to pull the toggle over center and to remove the pins from the holes in the arms of the latch members.

Due to the difficulty of the technique and the significant forces required for mounting the toggle, the setting of this latch of the prior art has typically required two persons. For example, to set the latch, the container has typically been removed from the door so that one person can stand on the container while the other person sets the latch. To reduce the significant forces required, there has been a great tendency to relieve some of the pressure on the arms associated with the latch members. This has typically been accomplished by bending the arms. Such a procedure has weakened the latch so that it has commonly opened with only minimal vibrations or accelerations such as those caused by merely hitting the container. In addition to unlocking the latch, this has resulted in opening the container so that the slide or slide/raft has fallen onto the floor of the aircraft. Not only must the container be reloaded and the latch reset, but until this is accomplished, these units are not ready for use in the event of an emergency.

In some cases, the over-center toggles have been jammed. With each of the pins of the toggles extending through a pair of closely spaced holes in opposing arms of the latch, the pins experience significant sheer forces which tend to bind the pins in the holes. Since these latches are seldom checked, this jamming of the latch would normally go undetected until an emergency occurred. The jamming of the latch at that time would be quite intolerable.

SUMMARY OF THE INVENTION

In accordance with the present invention, a latch is provided which is particularly adapted for use with containers in an aircraft emergency debarkation system. The latch is very easy to set, typically requiring only one person to close the container and set the latch. It is particularly advantageous that this can even be accomplished when the container is mounted to the door of the aircraft. The latch is particularly reliable once it is set and will not accidentally trip with excessive vibration. On the other hand, the latch is easily actuable under emergent conditions to permit the opening of the container and the deployment of the associated slide or slide/raft.

The latch includes a first latch assembly attached to one of the container members and a second latch assembly attached to the other of the container members. The first latch assembly may include a lanyard fixed to one of the container members and having a cylinder disposed at the opposite end of the lanyard.

The second latch assembly typically includes a pair of latch arms mounted to the second container member and pivotal relative to each other between a first position and a second position. In the first position the latch arms have a pair of first ends with a distal relationship and a pair of second ends with a proximal relationship. In the second position, the first ends have a proximal relationship while the second ends have a distal relationship.

The first ends of the latch arms are appropriately configured to receive the cylinder of the first latch assembly when the latch arms are in the first position, and to engage the cylinder to prevent removal of the cylinder when the latch arms are in the second position.

A trip mechanism which may include a lanyard and a ball can be set between the second ends of the latch arms when the latch arms are in the second position. This trip mechanism provides a positive lock which inhibits movement of the latch arms to the first position. Thus the trip mechanism provides means for positively locking the cylinder of the first latch assembly to the latch arms of the second latch assembly. In a preferred embodiment, the ball of the trip mechanism is biased into position by spring means which also biases the first and second latch arms to the second position.

When the latch is set and the container is mounted on the door of the aircraft, the angle of the lanyard of the trip mechanism with respect to the arms of the latch assembly is such that the ball associated with the lanyard cannot be removed. However, when the door is opened, both of the latch arms pivot on their mounting to establish a particular angular relationship between the lanyard of the trip mechanism. In the particular angular relationship, the ball can be removed from the latch arms to permit separation of the first and second latch assemblies and opening of the container.

The ball of the trip mechanism is removable by tension on the associated lanyard so that the opposite end of the lanyard need only be fixed to the floor of the aircraft prior to the opening of the door to facilitate automatic removal of the ball from the latch arms. From a manufacturing standpoint, it is particularly desirable that the latch arms can be identical.

While the specification concludes with claims particularly pointing out and distinctly claiming the subject matter which is regarded as the invention, it is believed that the invention, and the features and the advantages thereof will be better understood with a description of preferred embodiments and reference to the associated drawings.

DESCRIPTION OF THE DRAWINGS

FIG. 1 is a side elevational view of an emergency exit as seen from the interior of an aircraft;

FIG. 2 is a side elevational view of the door of the exit partially opened and supporting a container for an inflatable slide or raft;

FIG. 3 is a perspective view along lines 3—3 of FIG. 2 of one form of the latch assembly of the present invention, the assembly being illustrated in an open state permitting opening and closing of the container;

FIG. 4 is a side elevational view of the latch assembly illustrated in FIG. 3;

FIG. 5 is a cross-sectional view taken on lines 5—5 of FIG. 4 and illustrating the latch assembly in the closed state to secure the container;

FIG. 6 is an assembly view of the latch assembly illustrated in FIG. 3 and showing a pair of latch arms;

DESCRIPTION OF PREFERRED EMBODIMENTS

Figure 7:
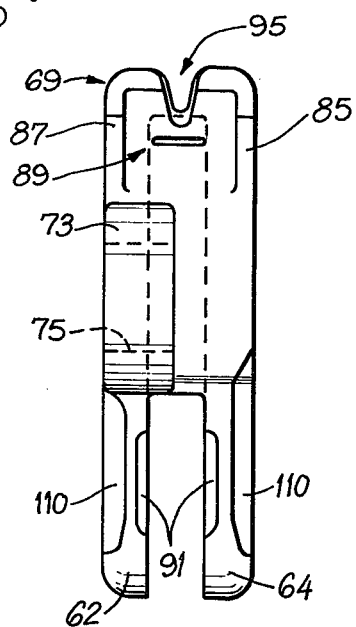
FIG. 7 is a side elevational view of one of the latch arms associated with the preferred embodiment of the assembly of the present invention.

An interior view of an aircraft is illustrated in FIG. 1 wherein structural members 11 support a wall 13 and a floor 14 of the aircraft. A door 15 in the wall 13 normally seals an emergency exit through which passengers can disembark the aircraft in the event of an emergency.

To facilitate this debarkation, a slide or slide/raft can be enclosed in a container shown generally at 17 which is mounted on the door 15 inside the aircraft. The slide or slide/raft can be of the inflatable type which is collapsible to fit into the container 17. A portion of the slide or slide/raft commonly referred to as a girt 19 extends from the lower portion of the container 17 to a girt bar 21. A pair of hangers 23 can be mounted on the container 17 to support the girt bar 21 in the normal door operation position illustrated in FIG. 1.

Under emergent conditions, the girt bar 21 will have been removed from the hangers 23 and secured to a pair of mounting members 25 on the floor 14 as shown in FIG. 2. When the door 15 is opened, the container 17 moves with the door while the girt bar 21 is held in fixed relationship with the floor 14. This relative movement between the girt bar 21 and the container 17 provides for the opening of the container 17 to deploy the inflatable slide or slide/raft.

The movement of the door 15 is of particular interest to the present invention. In the closed position, the door 15 seals a hole 27 in the wall 13 of the aircraft. It is well known that aircraft doors of this type are movable from a position inside the aircraft to seal the hole 27 and are held in this sealing relationship by a lock mechanism 28 and also by the pressure of the air within the aircraft which presses on the inner side of the door 15.

When the door 15 is opened, it first moves inwardly of the hole 27 and then swings angularly with respect to the hole 27 (as shown in FIG. 2) to a final position adjacent to the wall 13 and to one side of the hole 27.

The present invention is concerned primarily with the container 17 and a latch assembly shown generally at 29 in FIGS. 1, 2 and 3. The container 17 includes a first container member 31 which is mounted on the door 15 and a second container member 33 which pivots with respect to the first container member 31 on a hinge 35. The hinge 35 is typically disposed on the top of the container 17 as illustrated in FIGS. 1 and 2 so that the container 17 opens downwardly with respect to the door 15. With this preferred relationship, the latch 29 is typically located at the bottom of the container 17 as illustrated in FIGS. 1 and 2.

In a broad sense, the first container member 31 and the second container member 33 are merely representative of any pair of latchable members which might be openably secured by the latch 29.

The latch 29 in a preferred embodiment includes a first latch assembly 37 having a mounting bracket 39 which can be fixed to the first container member 31, for example, by a plurality of screws 41. The mounting bracket 39, which can be fabricated from sheet metal, includes a planar portion 46 which faces generally toward the second container member 33 and defines a hole 130.

Also included in the first bracket assembly 37 is a lanyard 43 which extends through the hole 130 in the bracket 39. Removal of the lanyard 43 from the hole 130 is inhibited by a ball 45 which is crimped to the end of the lanyard 43 and has a diameter greater than that of the hole 130. A cylinder 47 can be fixed to the lanyard 43 at the end thereof opposite the ball 45. With a further description of the latch 29 it will become apparent that the cylinder 47 merely provides an engageable object which can have generally any configuration.

As best illustrated in FIG. 5, the cylinder 47 can be provided with a channel 48. The channel 48 has a narrow portion 50 which extends toward the lanyard 43 and an enlarged portion 52 which extends away from the lanyard 43. After the lanyard 43 has been disposed in the channel 48, a ball 54 which has a diameter smaller than the enlarged portion 52 but greater than the narrow portion 50 can be crimped to the end of the lanyard 43. Thus the ball 54 will inhibit movement of the cylinder 47 beyond the end of the lanyard 43.

Referring again to FIG. 3 it will be noted that the latch 29 also includes a second latch assembly 49 which can be mounted to the second container member 33. The second latch assembly has a mounting means which includes a bracket 51 which is fixed to the second container member 33, for example, by a plurality of screws 53. The bracket 51 can have a substantially planar surface 55 which is generally perpendicular to the plane of the planar portion 46 of the bracket 39 when the container 17 is closed. Also included in the mounting means is a screw 57 which is fixed to the bracket 51 in substantially perpendicular relationship to the surface 55. It follows that when the container 17 is closed, the axis of the screw 57 in this particular embodiment is generally parallel to the plane of the planar portion 46 of the bracket 39.

A pair of latch arms 59 and 61, which can be mounted relative to the screw 57, are illustrated in an open relationship in FIG. 3, a closed relationship in FIG. 5, and a disassembled relationship in FIG. 6. In a preferred embodiment, the latch arms 59 and 61 are identical and are mounted on a sleeve bearing 63 which fits over the screw 57. The latch arms 59, 61 and the bearings 63 can be held in position by a pair of washers 65 and a nut 67 which registers with the threads of the screw 57. It will be apparent that in other embodiments of the latch 29, the sleeve bearing 63, one washer 65 and the nut 67 may be collectively replaced by a shoulder nut which would register with the threads of a shorter screw 57.

As described in greater detail below, it is desirable for the aircraft application that both of the latch arms 59 and 61 pivot with respect to the screw 57. It will be apparent, however, that in other embodiments of the latch 29, one of the arms 59 and 61 may be stationary, while the other of the arms 59 and 61 is pivotal to provide movement between the relative open and closed positions of the latch 29.

Figure 8:
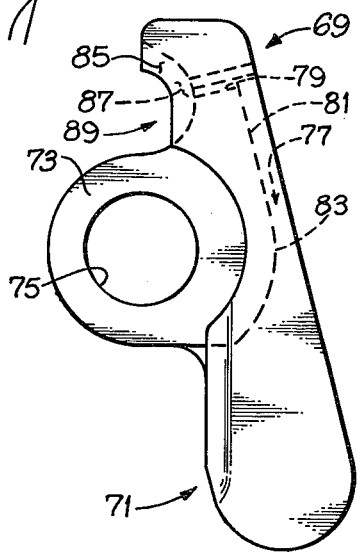
FIG. 8 is a plan view of the latch arm illustrated in FIG. 7.

As noted, in a preferred embodiment, the latch arms 59 and 61 are identical; for this reason, only one of the arms 59, 61 is described in detail below. With particular reference to FIGS. 7 and 8, it will be noted that these arms 59, 61 are somewhat longitudinal in configuration and have a first end shown generally at 69 and a second end shown generally at 71. Disposed generally between the first end 69 and the second end 71 of each of the arms 59 and 61 is a flange 73 which can be provided with a suitable aperture 75 to permit mounting of the associated arm 59, 61 on the sleeve bearing 63. Thus the aperture 75 defines a pivot point at its center which is located generally between the first end 69 and the second end 71. It follows that in the open position illustrated in FIG. 3, the first ends 69 of the arms 59 and 61 have a distal relationship while the second ends 71 of the arms 59 and 61 have a proximal relationship. In contradistinction, with the arms 59 and 61 in the closed position illustrated in FIG. 4, the first ends 69 have a proximal relationship while the second ends 71 have a distal relationship.

In this preferred embodiment, the arms 59 and 61 are configured to define a channel 77 which extends from a slot 79 at the first end 69, along the outermost edge, and toward the second end 71 of the associated arm 59, 61. The channel 77 is partially defined by a surface 81, a portion 83 of which curves about the center of the hole 75 with progressive positions from the first end 69 to the second end 71 of the associated arm 59, 61. At the second end 71 of the associated arm 59, 61, the channel 77 divides the associated arm 59, 61 to form bifurcated portions 62 and 64.

At the first end 69 of the arm 59, lips 85 and 87 define a recess shown generally at 89, which cooperates with a similar recess in the arm 61 to form a cavity 90 (FIG. 3). With the latch arms 59 and 61 in the closed position, the cavity 90 has the general shape of the engageable object such as the cylinder 47.

At the second end 71, the bifurcated portions 62, 64 of the latch arm 59 are provided with recesses 91 which face each other in the associated arm and also face similar recesses in the opposite latch arm 61. When the latch arms 59 and 61 are in the closed position, these recesses 91 in the bifurcated portions of the arms 59 and 61 form a confining area 92 which is appropriately configured to receive a tripping mechanism shown generally at 93 in FIG. 6. This tripping mechanism 93 is described in greater detail below.

In a preferred embodiment, the forwardmost portions of the first end 69 define a slot 95 which extends into the cavity 90 formed by the recesses 89. As illustrated in FIG. 5, when the cylinder 47 is disposed in the cavity 90, the lanyard 43 extends through the slot 95.

Means for biasing the arms 59, 61 to the closed position can be provided in the form of a leaf spring 97 having a closed end 99 and an open end 101. At the open end 101, the ends of the spring 97 are provided with tangs 103. Once the arms 59 and 61 have been mounted relative to the screw 57, the spring 97 can be slid into the channels 77 from the second ends 71 of the arms 59, 61 and toward the first ends 69. As the tangs 103, which extend inwardly of the latch arms 59, 61, approach the first ends 69, they will register with the slots 79 at the forward end of the channel 77. The spring 97 can be maintained in the slots 79 and the channels 77 of the arms 59, 61 by its own biasing characteristics which also urge the first ends 69 into the proximal relationship associated with the closed position of the latch 29.

In the preferred embodiment, the spring 97 operably disposed in the channels 77 has a contiguous relationship with the surface 81. The spring 97 is gradually bent around the curved portion 83 of the surface 81 as it approaches the second end 71 of the latch arms 59 and 61. With the arms 59 and 61 in the closed position, the bifurcated portions 62 and 64 could be provided with an area smaller than that illustrated in order to adequately provide protection for the spring 97. However, when the arms 59 and 61 are moved to the open position, the spring 97 tends to expand outwardly away from the curved portion 83 of the surface 81. In order to protect the spring 97 in its expanded state, the bifurcated portions 62 and 64 in a preferred embodiment are provided with a larger configuration.

In proximity to the confining area 92 formed by the recesses 91 in the bifurcated portions 62 and 64, the closed end of the spring 97 can be bent to form a spring portion 105 within the spring 97. In a preferred embodiment, the spring portion 105 has a U-shape and opens toward the second ends 71, downwardly in FIG. 5.

Also illustrated in FIG. 5 is the tripping mechanism 93 previously referred to with reference to the confining area 92 at the second ends 71 of the arms 59 and 61. This tripping mechanism 93 in a preferred embodiment includes a lanyard 107 which is connected to a nylon strap 109 in the girt 19. This nylon strap 109 is in turn connected to the girt bar 21. At the opposite end of the lanyard 107 a ball 111 can be fixed to the lanyard 107 in a manner similar to that described with reference to the cylinder 47.

The tripping mechanism 93 provides means for positively locking the arms 59 and 61 in the closed position illustrated in FIG. 5. After the container has been closed and the cylinder 47 has been disposed in the cavity 90 defined by the recesses 89, the spring 97 biases the arms 59, 61 to the closed position. In this position, the second ends 71 of the arms 59, 61 have the distal relationship which maximizes the size of the confining area 92 formed by the recesses 91. In this position, the ball 111 associated with the lanyard 107 can be disposed in the confining area 92 to maintain the distal relationship of the second ends 71. This, of course, will also maintain the first ends 69 in the proximal relationship. The spring portion 105 of the spring 97 can be provided with suitable dimensions for biasing the ball 111 within the confining area 92 formed by the recesses 91.

With the tripping mechanism 93 thus mounted, the container 17 is maintained in the closed state by the cylinder 47 which is held within the cavity 90 defined by the recesses 89. The ball 111 associated with the lanyard 107 prevents any enlargement of the cavity 90 which would be necessary to permit the cylinder 47 to escape from the latch arms 59 and 61. In this manner, the container 17 can be closed and the latch 29 can be positively locked by the tripping mechanism 93. This will be the normal state of the latch 29 until the mechanism 93 is tripped under emergent conditions.

When it is desired to prepare for deployment of the associated slide/raft or slide, the girt bar 21 can be disposed to the mounting members 25 on the floor 14. Subsequent opening of the door 15 creates a force on the lanyard 107 through the nylon strap 109 which may increase to a magnitude of approximately 20 pounds. This force will eventually overcome the bias of the spring portion 105 to permit removal of the ball 111 from the confining area 92 defined by the recesses 91. Once the ball 111 has been removed, the weight of the slide/raft or slide within the container 17 will generally be sufficient to overcome the bias of the spring 97 which holds the arms 59 and 61 in the closed position. This will permit the cylinder 47 to escape from the arms 59, 61 and the container 17 will pop open to deploy the slide or slide/raft.

Figure 9A:
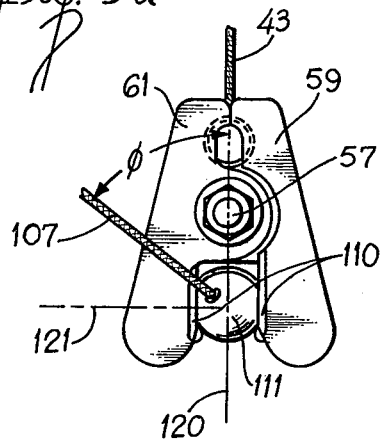
FIG. 9a is a schematic of the latch assembly illustrating a tripping mechanism in a first relationship with the latch arms.

One feature which makes the latch 29 particularly adapted for use in the aircraft debarkation system is associated with the angular relationship of the lanyard 107 and the latch arms 59 and 61. For the purposes of explanation, the longitudinal direction of the latch assembly 49 is shown by a dotted line 120 in FIGS. 9a and 9b.

When the door 15 is in the closed position, the downward tension on the lanyard 43 tends to maintain the cylinder 47, the screw 57 and the ball 111 in alignment with the lanyard 43. Of perhaps greater interest, however, is an angle between the lanyard 107 and the dotted line 120. This angle is designated $\phi$ in FIGS. 9a and 9b. When the door 15 is closed and the girt bar 21 is mounted to the floor 14, the angle $\phi$ is acute so that tension on the lanyard 107 merely draws the ball 111 toward the screw 57. As a result of ball 111 is more tightly embedded in the associated cavity 92. There is no outward component of force tending to pull the ball 111 toward the second ends 71 of the latch arms 59 and 61. Thus the ball 111 cannot be removed by accidental tension in an outboard direction on the lanyard 107 as long as the door 15 is closed. Such an accidental tension might be caused, for example, by someone tripping on the lanyard 107 prior to the opening of the door 15.

In order for the ball 111 to be removed from the cavity 92 defined by the recesses 91, the angle $\phi$ between the lanyard 107 and the dotted line 120 must be increased so that the force on the lanyard 107 has some component tending to pull the ball 111 away from the screw 57. For example, this disposition of the lanyard 107 may be along the dotted line designated by the reference numeral 121. Only after the angle $\phi$ becomes obtuse, can the ball 111 be removed from the cavity 92 formed by the arms 59 annd 61.

When the latch arms 59 and 61 are pivotally mounted on the container 17, this angle $\phi$ between the lanyard 107 and the line 120 increases with two independent motions. The first is the motion of the door 15 which moves angularly with respect to the girt bar 21 as the door 15 is opened. As the door 15 moves angularly with respect to the hole 27, the latch 29 on the container 17 also moves angularly with respect to the lanyard 107 which is connected to the girt bar 21.

The second of the independent motions is a pivotal motion of the latch arms 59 and 61 with respect to the screw 57. As the tension on the lanyard 107 increases, the second ends 71 of the arms 59 and 61 are pivoted toward the lanyard 107 so that the angle $\phi$ between the line 120 and the lanyard 107 increases. Thus, with these two independent motions, the angle $\phi$ increases until it becomes obtuse at which point the ball 111 is snapped from the bias of the spring portion 105 to unlock the latch arms 59 and 61. With the unlocking of these arms 59, 61, the tension on the lanyard 43 will pull the cylinder 47 from the first end 69 of the arms 59, 61 to permit opening of the container 17.

Figure 9B:
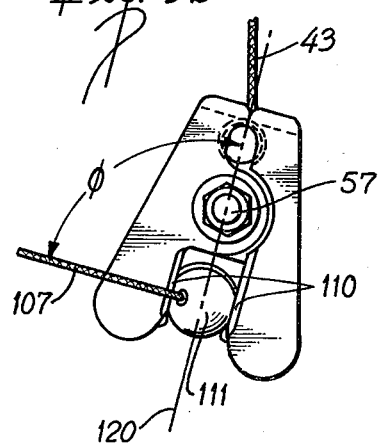
FIG. 9b is a schematic of the latch assembly illustrating the tripping mechanism in a second relationship with the latch arms.

As best illustrated in FIG. 7, the slot 95 extends across the entire forward portion of the latch arms 59 and 61 at the first ends thereof. This extension of the slot 95 provides an area into which the lanyard 43 can move as the arms 59 and 61 pivot on the shaft 57 as illustrated in FIG. 9b. It may also be desirable to provide the latch arms 59 and 61 with beveled surfaces 110 along their top innermost edges in proximity to the recesses 91. These beveled surfaces 110 guide the lanyard 107 over the tops of the arms 59, 61 to inhibit any cutting of the lanyard 107 or scoring of the latch arms 59, 61.

From the foregoing discussion it can be appreciated that the latch 29 has several desirable features, many of which make it particularly adapted for use in an emergency debarkation system of an aircraft. The fact that the latch 29 can be set by a single individual with the container 17 mounted on the door 15 will be particularly appreciated by those responsible for this function.

The reliability of the latch 29 in the set configuration is also particularly advantageous. With the tripping mechanism attached, the arms 59 and 61 are positively locked to the closed position. Only removal of the ball 111 will permit opening of the latch arms 59 and 61. In the aircraft application, this removal of the ball 111 is inhibited when the door 15 is closed and is facilitated when the door 15 is moved to the open position.

Thus the latch 29 can be relied upon once it has been set to maintain the container 17 closed during normal operation of the aircraft. Under emergent conditions, however, the deployment of the girt bar 21 and the opening of the door 15 automatically moves the latch relative to the girt bar 21 to facilitate the automatic removal of the ball 111 and the unlocking of the latch arms 59 and 61.

Thus a latch is provided with new and improved concepts which result in a true advancement in the art due to its simplicity, utility, and economy. Many other embodiments and alterations of the described embodiments will now become evident to those skilled in the art without avoiding the scope and intent of the invention as defined in the following claims.

I claim:

1. An emergency debarkation system adapted for use with an aircraft having a door movable relative to a floor of the aircraft, the system being operable to facilitate the emergency debarkation of personnel in the aircraft, including:
    a first container member mounted on the door of the aircraft;
    a second container member hingeably mounted on the first container member and defining with the first container member a container;
    inflatable means disposed in the container and being automatically deployable with the opening of the container to provide a slide or slide/raft for the debarkation of the personnel in the aircraft;
    a first latch assembly attached to one of the first container member and the second container member;
    a second latch assembly attached to the other of the first container member and the second container member and having an engaging relationship with the first latch assembly to secure the container when the container is closed;
    locking means cooperating with the second latch assembly for positively locking the second latch assembly in the engaging relationship with the first latch assembly to inhibit opening of the container; and
    means for fixing the locking means to the floor of the aircraft to activate the locking means with the opening of the door of the aircraft to permit the opening of the container and the deploying of the inflatable means.

2. The emergency debarkation system set forth in claim 1 wherein the locking means includes:
    a lanyard having one end thereof fixed to the floor of the aircraft;
    particular means disposed at the other end of the lanyard and adapted for cooperation with the second latch assembly to positively lock the second latch assembly in the engaging relationship with the first latch assembly;
    the lanyard having a first angular relationship with the second latch assembly when the door is closed, and having a second angular relationship with the second latch assembly when the door is being opened;
    the lanyard in the first angular relationship being nonremovable from the second latch assembly with tension on the lanyard to inhibit accidental opening of the container; and
    the lanyard in the second angular relationship being removable from the second latch assembly with tension on the lanyard to permit automatic opening of the container and deployment of the inflatable means with the opening of the door of the aircraft.

3. The latch recited in claim 1 wherein the second latch assembly includes:
    a first latch arm being longitudinal in configuration and having a first end and a second end;
    a second latch arm similar to the first latch arm and being longitudinal in configuration with a first end disposed relative to the first end of the first latch arm and a second end disposed relative to the second end of the first latch arm;
    mounting means for pivotally mounting the first latch arm and the second latch arm to the other of the first container member and the second container member;
    the first latch arm and the second latch arm being operable to engage the first latch assembly to secure the container when the container is closed; and
    the locking means cooperating with the second ends of the first latch arm and the second latch arm for positively locking the second latch assembly in the engaging relationship with the first latch assembly.

4. The latch recited in claim 3 further comprising means for biasing the first latch arm and the second latch arm into the engaging relationship with the first latch assembly.

5. The latch recited in claim 4 wherein the biasing means includes a leaf spring having side portions which extend generally from the first ends to the second ends of the first and second latch arms and a central portion disposed between the side portions and having a U-shape opening toward the second ends of the first and second latch arms, the central portions being configured to bias the locking means between the second ends of the first and second latch arms to positively lock the second latch assembly in the engaging relationship with the first latch assembly.

6. A latch for operably securing a container having a first container member and a second container member movable relative to each other between open and closed positions and containing inflatable means deployable in the open position of the first and second container members, the latch comprising:
    means connected to the first container member for providing a first latch assembly;
    means connected to the second container member for providing a second latch assembly cooperating with the first latch assembly to operably secure the first container member to the second container member;

mounting means included in the first latch assembly and having a fixed relationship with the first container member;

a first latch arm included in the first latch assembly and mounted on the mounting means;

a second latch arm included in the first latch assembly and mounted on the mounting means;

the second latch arm being movable relative to the first latch arm between a first relative position, wherein the first latch assembly is secured to the second latch assembly to lock the first and second container members, and a second relative position, wherein the second latch assembly and the first latch assembly are separable to provide for the opening of the first and second container members;

retaining means cooperating with at least the second latch arm to maintain the first latch arm and the second latch arm in the first relative position, the retaining means being operable to provide for movement of the first latch arm relative to the second latch arm to the second relative position to open the container; and actuating means responsive to the operation of the retaining means to produce a movement of the first latch arm relative to the second latch arm to the second position.

7. The latch recited in claim 6 wherein:

the first latch arm has a first end and a second end;

the second latch arm has a first end disposed relative to the first end of the first latch arm and a second end disposed relative to the second end of the first latch arm;

the first ends have a proximal relationship and the second ends have a distal relationship when the first and second latch arms are in the first relative position; and the first ends have a distal relationship and the second ends have a proximal relationship when the first and second latch arms are in the second relative position.

8. The latch set forth in claim 7 further comprising sleeve means disposed intermediate the first end and the second end of the second latch arm for pivotally mounting the second latch arm on the mounting means, the sleeve means providing for movement of the second latch arm relative to the first latch arm between the first relative position and the second relative position.

9. The latch set forth in claim 6 wherein the retaining means includes a ball fixed to the end of a lanyard, the ball being constructed for disposition between the first latch arm and the second latch arm to maintain the first latch arm and the second latch arm in the first relative position, and the ball being removable from the first latch assembly to provide for movement of at least the second latch arm relative to the first latch arm to the second relative position to obtain an opening of the container.

10. The latch set forth in claim 6 wherein the first latch arm and the second latch arm have identical confgurations and the actuating means includes a spring extending around the first and second latch arms.

11. A latch assembly constructed for cooperation with a first latch element attached to a first latchable member to secure the first latchable member to a second latchable member, the latch assembly comprising:

mounting means having a fixed relationship with the second latchable member;

a first latch arm mounted on the mounting means and having a first end and a second end;

a second latch arm mounted on the mounting means and having a first end disposed for registration with the first end of the first latch arm and a second end disposed for registration with the second end of the second latch arm;

at least a particular one of the first latch arm and the second latch arm being movable relative to the mounting means and the other latch arm between a first position and a second position;

the first ends of the first and second latch arms having a proximal relationship in the first position of the particular one of the first and second latch arms and being registerable with the first latchable member in such first position to secure the first latachable member to the second latchable member;

the first ends of the first and second latch arms in the second position having a distal relationship providing for disengagement between the first and second latchable members;

retaining means cooperating with the second ends of the first and second latch arms for maintaining the first and second latch arms in the first position of the particular one of the first and second latch arms, the retaining means being actuatable relative to the second ends of the first and second latch arms to provide for disposition of the first and second latch arms in the second position of the particular one of the first and second latch arms and separation of the first and second latchable members; and actuating means cooperative with the first and second latch arms for actuating the particular latch arm to the second position relative to the other latch arm.

12. The latch assembly recited in claim 11 wherein the actuating means include a spring member biasing the particular latch arm relative to the other latch arm toward the second position.

13. The latch assembly recited in claim 11 wherein:

the second ends of the first and second latch arms in the first position have a distal relationship and are registerable with the retaining means to maintain the first and second latch arms in the first positions;

the second ends of the first and second latch arms in the second position have a proximal relationship; and the retaining means is removable from the second ends of the first and second latch arms in accordance with the actuation of the retaining means to provide for movement of the second end of the particular latch arm relative to the other latch arm to the second position and to provide for separation of the first and second latchable members.

14. The latch assembly set forth in claim 13 wherein the actuating means includes a leaf spring extending around the second ends of the first and second latch arms to positions co-operative within the first ends of the first and second latch arms for actuating the particular latch arm to the second position relative to the other latch arm upon actuation of the actuating means.

15. The latch assembly recited in claim 14 wherein the leaf spring also cooperates with the retaining means to bias the retaining means into an operable position between the second ends of the first and second latch arms when the first and second latch arms are in the first position.

16. The latch assembly set forth in claim 11 wherein said first latchable member comprises a first container member;
said second latchable member comprises a second container member movable relative to the first container member between first and second positions defining open and closed positions with the first container member;
and said mounting means includes a mounting shaft fixed to the second latchable member;
the latch element being attached to one of the first container member and the second container member;
the first and second arms being attached to the other of the first container member and the second container member and having properties for engaging the latch element to secure the first and second container members when the container members are in the closed position and for providing a relative movement of the first and second container member to the open position when the particular latch arm is actuated to the second position relative to the other latch arm; and
deployable means disposed between the first and second container members for deployment when the first and second container members are moved relative to each other to the open position.

17. An emergency debarkation system adapted for use with an aircraft having a door movable relative to a floor of the aircraft, the system being operable to facilitate the emergency debarkation of personnel in the aircraft,
first container means mounted on the door of the aircraft,
a second container means pivotally mounted relative to the first container member to form a container with the first container means,
inflatable slide means disposed in the container and deployable upon a pivotal movement of the second container means relative to the first container means to provide a slide for the debarkation of the personnel in the aircraft,
first latch means attached to the first container means and movable between first and second positions and operable in the first position to retain the inflatable means in the container and operable in the second position to provide for a deployment of the inflatable means,
second latch means operatively coupled to a fixed position on the aircraft and operatively coupled to the first latch means for normally maintaining the first latch means in the first position, the second latch means being responsive to a pivotal movement of the door to an open position for providing a movement of the first latch means to the second position; and
third latch means operatively coupled to the first and second container means for providing for the deployment of the inflatable means upon the movement of the first latch means to the second position.

18. The system set forth in claim 17 wherein:
the first latch means includes a pair of arms each having first and second ends and pivotable to the first position to provide the first ends in close relationship and pivotable to the second position to provide the second ends in close relationship and further includes means for biasing the arms toward the first position,
the second latch means includes detaining means disposed between the pair of arms in the first latch means to retain the arm in the first position and further includes a lanyard attached at opposite ends to the detaining means and to the fixed position on the aircraft to provide for the removal of the detaining means from the position between the arms upon an opening and pivotal movement of the door.

19. The system set forth in claim 18 wherein:
the third latch means includes detainer means disposed between the pair of arms in the first latch means in the first position of the first latch means and further includes a lanyard attached at opposite ends to the detainer means in the third latch means and to the second container means to provide for a removal of such detainer means from the position between the arms in the first latch means upon a movement of the arms to the second position.

20. The system set forth in claim 18 wherein:
the biasing means constitutes a leaf spring extending around the detaining means in the first latch means and the arms in the first latch means in the first position of the arms to bias the arms to the first position.

21. The combination set forth in claim 18 wherein the lanyard is disposed at an angle to the detaining means in the closed position of the door to maintain the disposition of the detaining means between the pair of arms in the latch means and wherein the lanyard is pivotable, in accordance with the initial pivotal movement of the door, to a position to produce a removal of the detaining means from the position between the arms upon a further pivotal movement of the door.

22. A latch for operably securing inflatable slide means in the door of an aircraft and releasable for the debarkation of personnel from the aircraft under emergency conditions, including,
first means movable with the door of the aircraft, the first means being constructed to releasably retain the inflatable slide means,
second means pivotable relative to the first means,
first latch means disposed on the first means and movable between first and second positions and operable in the first position to retain the inflatable slide means in the first means and operable in the second position to provide for a release of the inflatable slide means from the first means,
means included in the first latch means for biasing the first latch means toward the first position,
second latch means operably coupled to the first latch means to retain the first latch means in the first position and responsive to the opening of the door to provide for the movement of the first latch means to the second position, and
third latch means operably coupled to the first latch means in the first position and responsive to the movement of the first latch means to the second position to provide for the release of the inflatable slide means from the first means.

23. The combination set forth in claim 22 wherein:
the second latch means includes detaining means for retaining the first latch means in the first position and wherein the detaining means is movable from the retaining relationship with the first latch means upon the movement of the door from the closed position and wherein the first latch means is movable to the second position upon the movement of the detaining means from the retaining position.

24. The combination set forth in claim 22 wherein: the biasing means includes a spring operably coupled to the first and second latch means to bias the first latch means toward the first position while the second latch means is retaining the first latch means in the first position.

25. The combination set forth in claim 23 wherein: the first latch means includes a pair of arms movable to first and second operable relationships and wherein the biasing means includes a leaf spring extending around the arms and the detaining means for biasing the arms toward the first operative relationship while the detaining means is retaining the arms in the first operative relationship.

26. The combination set forth in claim 22 wherein: the third latch means includes means retained by the first latch means in the first position of the first latch means and responsive to the opening of the door, after the movement of the first latch means to the second position, for movement from the retaining position to provide for the release of the inflation slide means from the first means.

27. The combination set forth in claim 23 wherein: the detaining means includes a first member detained by the pair of arms in the first operative relationship of the arms and a lanyard attached at one end to the door and at the other end to a fixed position on the aircraft and the third latch means includes a second member detained by the pair of arms in the first operative relationship of the arms and a second lanyard attached at one end to the second member and at the other end to the second means.

28. The combination set forth in claim 27 wherein the lanyard is disposed at an angle to the detaining means in the closed position of the door to maintain the detaining means in the retaining relationship with the first latch means and is pivotable, in accordance with the initial opening of the door, to a position for removing the detaining means from the retaining relationship in accordance with the further opening of the door.

* * * * *